UNITED STATES PATENT OFFICE.

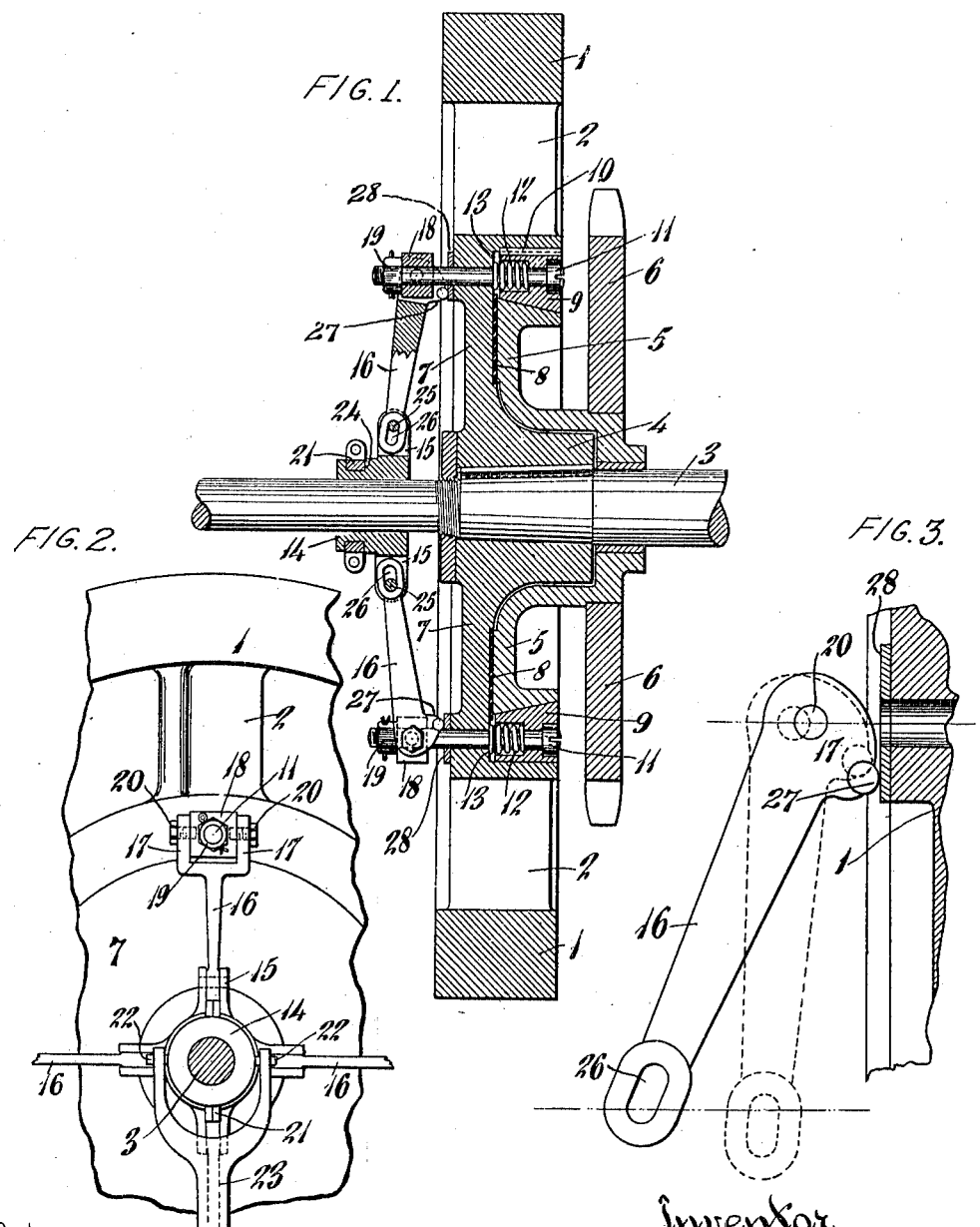

GUSTAVE A. SCHACHT, OF CINCINNATI, OHIO.

FRICTION-CLUTCH MECHANISM.

986,947.  Specification of Letters Patent.  Patented Mar. 14, 1911.

Application filed November 8, 1909. Serial No. 526,829.

*To all whom it may concern:*

Be it known that I, GUSTAVE A. SCHACHT, a citizen of the United States of America, and a resident of Cincinnati, in the county of Hamilton and State of Ohio, have invented certain new and useful Improvements in Friction-Clutch Mechanism, of which the following is a specification.

My invention relates to machine clutches generally, but more particularly to friction-clutch mechanism used in connecting the driving-mechanism of an automobile with the gasolene engine or other source of power.

The object of my invention is to provide a simple, inexpensive and extremely efficient clutch that may be easily operated to and from frictional-engagement and at the same time stand the wear and tear that this form of clutch generally encounters in use.

In carrying out my invention, I provide a fly-wheel or gland of peculiar construction, rigidly keyed to a shaft, a friction-disk loosely mounted and normally free to slide on said shaft, with the engaging-surface of said friction-disk extending inside the vertical, revolving plane of said fly-wheel and having a beveled periphery, a wedge-shaped or beveled annular-member interposed between the rim of the fly-wheel and said beveled periphery of the friction-disk, and means for operating the said friction-disk and annular-member to and from engagement within said fly-wheel. The friction-disk is provided with two frictional-engaging surfaces, one surface being a perpendicular plane or broadside one and engaging a corresponding adjacent, perpendicular plane or broadside one on the fly-wheel and the other surface being one beveled horizontally and adapted to be engaged by a correspondingly beveled or wedge-shaped peripheral face on the said annular-member which is adjusted to and from frictional-contact by novel means located and operated on the opposite side of the fly-wheel.

In the accompanying sheet of drawings:—

Figure 1 is a vertical section taken through a fly-wheel or gland and friction-clutch containing my invention. Fig. 2 is a fragmentary elevation taken at right-angles to Fig. 1, showing the fly-wheel and the accompanying clutch-operating devices. Fig. 3 is a detail elevation of the lever mechanism comprising part of the operating means for the beveled or wedge-shaped annular friction-member.

Referring to said views, 1 indicates a fly-wheel or gland having spokes 2 placed slightly at an angle to form ventilating fan-blades. The fly-wheel 1 is keyed to shaft 3 and has a hub 4. Mounted loosely on shaft 3 is a friction-disk 5 having a sprocket 6, in turn mounted thereon in any suitable manner.

Placed on the central webbed-portion 7 of the fly-wheel 1 is a flat fiber ring 8 to furnish a positive contact-surface for the friction-disk 5 and to protect the metal against battering when the friction-disk 5 is thrown into engagement with the said webbed portion 7 of the fly-wheel.

Placed in a suitably recessed portion of the fly-wheel is an annular wedge-shaped or beveled frictional-member 9 that is adapted for engagement with the friction-disk 5, and that, also, causes the friction-disk 5 to forcibly engage the friction fiber-disk 8. The annular friction-member 9 is preferably keyed to the fly-wheel 1 by one or more keys 10 and is adapted to slide to and from friction-engagement on said keys. The wedge-shaped or beveled annular-member 9 is provided with suitable holes to receive a plurality of transverse slidable bolts 11, the latter, also, passing through suitably registering openings made in the fly-wheel 1. The openings in the wedge-shaped annular-member 9 are preferably counter-bored on the inner side to receive springs 12, the latter being compressed between the surface 13 of the fly-wheel and the bottom of said counter-bore in the wedge-shaped member 9. These springs 12 are provided to automatically space or normally keep the annular wedge-shaped member 9 out of engagement with the friction-disk 5.

On shaft 3 is a collar 14 having forks or spaced lugs 15 extending therefrom. Levers or arms 16 are pivotally and slidably connected to the said spaced lugs or forks 15, and are peculiarly shaped, as best shown in Fig. 3. The outer end of each lever or arm 16 is bifurcated and extended as a pair of prongs or elevations 17 that are eccentric in shape. A block 18 is pivotally held between said prongs 17 of the lever or arm 16 and is adapted to receive the end of the bolt 11, a nut 19 being used to hold said block 18 in position. Said block 18 is provided with side sockets or recesses to receive the inner journal ends of the screws 20 in the prongs 17 (as seen in dotted-lines in Fig. 2). The collar 14 is slidably-mounted upon the shaft 3 and is also provided with a yoke or collar 21 having pins 22 to which latter a fork or operating-rod 23 is attached. Of course, the collar 21 is preferably made in halves so that it can be duly mounted in groove 24 of collar 14. The arms 15 of the main collar 14 are provided with pins 25 which pass through the openings 26 in the ends of the levers or arms 16. The slots or elongated openings 26 at the inner ends of the levers or arms 16 allow the latter to be moved a suitable distance away from the journal of the fly-wheel without changing the radial distance of the respective pivots 20 in the other end of the several levers or arms 16. The main collar 14 is moved outwardly or inwardly, as desired, by means of the fork or operating-arm 23 and thereby controls the engagement of the beveled or wedge-shaped annular-member 9 with the friction-disk 5.

In Fig. 1, the friction-disk is shown as being in engagement with the fiber ring 8 and the beveled or wedge-shaped annular-member 9 is shown engaging the friction-disk 5, thus causing the latter to rotate with the fly-wheel 1, and, of course, rotating in turn, the sprocket 6. When it is desired to throw the clutch out of engagement, the operating-arm 23 is moved in an outwardly direction, thereby moving the main collar 14 away from the journal of the fly-wheel and causing the several levers or arms 16 to assume the position shown in solid lines in Fig. 3 (the dotted-lines in Fig. 3 illustrating the position in which the levers or arms 16 are shown in Fig. 1). When the main collar 14 is moved in the direction just mentioned, the pivot-points 20 on the eccentric end of the several levers or arms 16 are moved closer to the fly-wheel 1, as best seen in Fig. 3. It is obvious, as seen in Fig. 3, how the pivot-points 20 move in a straight line when the opposite end of the lever or arm 16 is moved laterally. Thus, in moving the main collar 14 by means of the operating-arm 23 laterally, I vary the distance of the pivot-point 20 on the eccentric end of the lever or arm 16 and, also, thereby move the annular wedge-shaped friction-member 9 laterally, thus engaging the friction-disk 5.

It is apparent that I easily obtain a great leverage through the agency of the levers or arms 16 and the collar 14 as the eccentric-engaging portion 27 engages the surface 28 of the fly-wheel and forms the slidable fulcrums of the levers or arms 16. When the main collar 14 is moved outwardly from the position shown in Fig. 1, the springs 12 are of sufficient elastic strength to cause the beveled or wedge-shaped annular-member 9 to disengage the friction-disk 5, thereby quickly disengaging or freeing the clutch.

Many modifications may be made without departing from the spirit and scope of my invention herein and, therefore, I do not wish to be understood as confining myself to the exact details shown.

I claim:—

1. In a friction-clutch mechanism, a shaft, a fly-wheel or gland fastened thereto and having a flat broadside engaging-surface, a friction-disk loosely mounted and normally free to slide on said shaft and having a flat broadside engaging-surface adapted to engage said broadside-engaging surface on the fly-wheel, a beveled or tapering engaging-surface on the friction-disk, a tapering or wedge-shaped member adapted to revolve with the fly-wheel and means for adjusting the wedge-shaped member to and from engagement with said friction-disk.

2. A friction-clutch mechanism comprising a fly-wheel or gland rigidly mounted on a shaft, a friction-disk having two engaging surfaces, one a flat broadside surface adapted to engage a corresponding surface on the fly-wheel, and the other a beveled peripheral one, a tapering or wedge-shaped annular member adapted for engagement with said beveled surface on the friction-disk and means for operating the wedge-shaped annular friction-member to and from engagement with said friction-disk.

3. A friction-clutch comprising a fly-wheel, a friction-disk having both a plane side-face and a beveled peripheral frictional-contact within the rotating plane of the fly-wheel, an annular-member mounted on the fly-wheel and having a beveled inner face adapted to engage the beveled peripheral face of said friction-disk and simultaneously force the other broadside surface of the friction-disk into engagement with a frictional broadside surface on the fly-wheel and means for controlling the lateral movement of the annular, frictional wedge-shaped member.

4. A friction-clutch comprising a fly-wheel rigidly mounted on a shaft, a friction-disk loosely mounted and normally free to slide on said shaft, a beveled or wedge-shaped ring mounted on said fly-wheel, substantially in the same plane as the friction-disk, and means for operatively-moving the said beveled ring to and from frictional-relation with the friction-disk and fly-wheel, said means comprising a collar loosely mounted on said shaft and provided with a plurality of arms or levers suitably connected thereto, the outer portion of said arms being eccentric in shape and pivoted to transverse bolts, the latter passing through the fly-wheel and said wedge-shaped annular frictional-member.

5. A friction-clutch comprising a fly-wheel mounted on a shaft, a fiber ring attached to one side-face of the fly-wheel, a friction-disk loosely mounted and normally free to slide on said shaft and adapted to engage said fiber ring, a beveled or wedge-shaped annular-member mounted on said fly-wheel and adapted to slide between the periphery of the friction-disk and a recessed portion of the fly-wheel, transversely-slidable bolts extending through the beveled or wedge-shaped ring and radial arms or levers pivotally-connected to said bolts and a slidable collar mounted on the shaft and pivotally-connected to said arms or levers.

6. A friction-clutch comprising a fly-wheel mounted on a shaft, a friction-disk loosely mounted and normally free to slide on said shaft for reciprocal engagement within said fly-wheel, a suitably beveled annular-member adapted for engagement with said friction-disk substantially within the revolving plane of the fly-wheel, means for controlling the lateral movement of the said annular-member and comprising a collar loosely mounted and adapted to slide on said shaft, another collar loosely mounted on and carried by said first-named collar and an operating fork suitably connected and adapted to move the first-named collar, a plurality of arms or levers connected to the first-named collar and pivotally-connected to transverse bolts passing through the wedge-shaped annular-member of the fly-wheel and thence through said fly-wheel, and means whereby the annular wedge-shaped member is moved laterally to and from engagement with the friction-disk when the collar is moved laterally on the shaft.

7. A friction-clutch comprising a fly-wheel mounted on a shaft, a friction-disk loosely mounted and normally free to slide on the shaft, two friction-contact surfaces on the friction disk, an annular wedge-shaped or beveled member adapted to engage one of said friction-contact surfaces of the friction-disk, means for automatically disengaging said annular wedge-shaped or beveled member from contact with said friction-disk, means for forcing the annular wedge-shaped member in engagement with the friction-disk, said means comprising a collar loosely mounted and adapted to slide on the shaft, a plurality of radial arms or levers suitably attached to said collar and indirectly attached to the annular wedge-shaped or beveled member.

GUSTAVE A. SCHACHT.

Witnesses:
JOHN ELIAS JONES,
LAURA E. SHIELDS.

---

Copies of this patent may be obtained for five cents each, by addressing the "Commissioner of Patents, Washington, D. C."